United States Patent [19]

Sürig

[11] Patent Number: 4,851,954
[45] Date of Patent: Jul. 25, 1989

[54] MONITORING APPARATUS FOR MONITORING TEMPERATURE IN A CIRCUIT ARRANGEMENT

[75] Inventor: Andreas Sürig, Lübeck, Fed. Rep. of Germany

[73] Assignee: Drägerwerk Aktiengesellschaft, Lübeck, Fed. Rep. of Germany

[21] Appl. No.: 256,994

[22] Filed: Oct. 13, 1988

[30] Foreign Application Priority Data

Oct. 15, 1987 [DE] Fed. Rep. of Germany ....... 3734886

[51] Int. Cl.⁴ .............................................. H02H 5/04
[52] U.S. Cl. ..................................... 361/103; 361/106; 361/18; 323/271; 323/272; 323/907; 307/310
[58] Field of Search ............... 361/100, 101, 103, 106, 361/18; 307/310; 323/271, 272, 907

[56] References Cited

U.S. PATENT DOCUMENTS

| | | | |
|---|---|---|---|
| 3,109,135 | 10/1963 | Goldman | 323/271 |
| 3,480,852 | 11/1969 | Hung | 307/310 |
| 3,794,950 | 2/1974 | Kilner | 361/106 |
| 3,959,713 | 5/1976 | Davis et al. | 361/103 |
| 4,053,996 | 10/1977 | Schertz et al. | 361/103 |
| 4,536,699 | 8/1985 | Baker | 361/18 |
| 4,614,906 | 9/1986 | Maxham | 361/18 |
| 4,800,331 | 1/1989 | Vesce et al. | 361/106 |

FOREIGN PATENT DOCUMENTS 2532081 3/1977 Fed. Rep. of Germany .

Primary Examiner—A. D. Pellinen
Assistant Examiner—H. L. Williams
Attorney, Agent, or Firm—Walter Ottesen

[57] ABSTRACT

Apparatus for monitoring the temperature of a circuit component in a circuit arrangement wherein the circuit can be influenced via a temperature sensor when a predetermined value is exceeded for the purpose of preventing undesired high temperatures. This apparatus is improved for its use in inherently safe electronic switching circuits in that it provides the smallest possible volumetric configuration and, in addition, enables a reliable switching characteristic to be realized which is selectable within narrow temperature ranges. It is intended that the testing of its functional capability should be possible with the aid of simple means when in the built-in condition. For this purpose, a plurality of circuit components are connected in series or in parallel.

6 Claims, 2 Drawing Sheets

MONITORING APPARATUS FOR MONITORING TEMPERATURE IN A CIRCUIT ARRANGEMENT

FIELD OF THE INVENTION

The invention relates to an apparatus for monitoring the temperature of a circuit component in a circuit arrangement. The apparatus includes a temperature sensor and operates on the circuit to prevent undesired high temperatures when the temperature exceeds a predetermined value.

BACKGROUND OF THE INVENTION

A switching arrangement of the kind referred to above can be used generally for fluid, electric or pneumatic switching purposes. In an electric monitoring arrangement disclosed in German published patent application DE-OS 2,532,081, a switching arrangement is provided wherein it is intended to protect a busbar against undesired heating as a consequence of increased current output. For this purpose, a temperature sensor in the form of a bimetal switch is applied from the outside to the busbar. The bimetal switch is connected into the secondary circuit of a transformer having a primary circuit which is connected to a voltage source. A relay is connected in parallel to the bimetal switching circuit as a monitoring arrangement which is picked up with the voltage present and maintains the current supply for the busbar to be monitored by means of the closed operating contacts. If the busbar reaches such a high temperature because of too high a current flow in a defect situation that the bimetal switch short-circuits the secondary side of the transformer corresponding thereto, then the voltage drops at the primary side so that the relay opens and the current supply for the busbar is interrupted.

For the known circuit arrangement, the relay circuit serves as an actuator for switching in and out the corresponding actuating quantity, that is, the current supply through the busbar to be monitored. The monitoring arrangement comprises the relay circuit connected to the current source and the bimetal switch parallel to the relay circuit with the corresponding transformer. This monitoring circuit is brought into operative connection with the switching component to be monitored via the bimetal switch. The switching component to be monitored is the busbar.

The use of bimetal switches limits the response precision of the monitoring arrangement because of their switching hysteresis. The large configuration of the switches makes their use in the smallest electronic circuits impossible.

The utilization of thermal fuses is set forth in the German Industrial Standard DIN 57 631 of December 1983 and in the International Standard IEC-691, first edition 1980. The alternative utilization of thermal fuses in electric switching circuits has similar disadvantages, namely: the response times run to several seconds (up to approximately 15 seconds); the response temperature can be selected in only a limited manner in steps; their functional reliability can not be checked with reasonable cost and complexity; and, their switch-off performance is dependent upon their thermal history.

All these disadvantages make the use in fast switching electronic circuits difficult, especially maintaining the reproducible switching temperature for intrinsically safe switching circuits, which are intended to operate in potentially explosive ambient atmospheres, is not guaranteed.

SUMMARY OF THE INVENTION

It is an object of the invention to provide a monitoring arrangement of the kind described above so that, for its application in inherently safe electronic switching circuits, the smallest possible volumetric structural configuration is provided as well as a reliable switching characteristic which is selectable within narrow temperature ranges. Also, it is intended that the testing of the monitoring arrangement as to its operational capability should be possible with simple means in the built-in condition.

The monitoring arrangement according to the invention is realized as a combination of an apparatus for supplying load current to a load with an arrangement for monitoring a switching component which can influence this load current. The combination includes: at least two of the switching components connected to each other and each of which generates heat in the presence of a defect condition; a first temperature sensor corresponding to one of the switching components for detecting the heat generated therein in the event of a defect condition; first circuit means for operatively connecting the first temperature sensor to the other one of the switching components for actuating the latter in response to the defect condition to thereby influence the load current to prevent the one switching component from becoming heated to unwanted higher temperatures; a second temperature sensor corresponding to the other one of the switching components for detecting the heat generated therein in the event of a defect condition; and, second circuit means for operatively connecting the second temperature sensor to the one switching component for actuating the latter in response to the defect condition to thereby influence the load current to prevent the other one of the switching components from becoming heated to unwanted higher temperatures.

The advantage of the invention is seen essentially in that the monitoring of the circuit components takes place such that when one of the circuit components fails then the other circuit component which is still intact acts as an actuator to influence the electric circuit in such a manner that the damaging or impairing effect such as increased temperature on the defective switching component is eliminated. The electric circuit can in this way be brought into safe operating or quiescent condition even for a danger-generating malfunction of the one switching component.

Such a monitoring arrangement is especially usable with intrinsically safe circuits wherein the switching components are utilized in a redundant manner. The switching components can then monitor each other when increased temperature is present and the one operates the other as an actuator and switches the electric circuit.

For the case of temperature monitoring, it has been shown advantageous to configure the temperature sensors as temperature-dependent resistors. The selection of thermistors (NTC) is especially advantageous since they are available in especially small structural configuration and have high sensitivity for a temperature range from −55°C. to +350°C. and avoid the disadvantages of the known bimetal switches and other known thermal-opening devices.

An especially advantageous configuration of the circuit arrangement is provided in that the monitoring arrangement includes transistors as actuators each having a comparator which is connected to its own bridge circuit. The bridge circuit becomes unbalanced by means of the changeable, temperature-dependent resistance of the temperature sensor in the case of a malfunction so that a resultant error signal from the defective actuator is conducted to a circuit of the undamaged actuator. The selection of a bridge circuit is advantageous since the temperature measurement then occurs proportionally and the switching temperature and switching hysteresis can be freely selected in a wide range by a suitable selection of components.

In this way, a fast-operating circuit arrangement is obtained such as is required in transistor circuits in order to make possible, in a malfunction situation, a reliable switch off of an apparatus driven by the circuit arrangement.

With the invention, a monitoring arrangement is provided by means of which an inherently safe electric switching circuit can be built up in a reliable manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
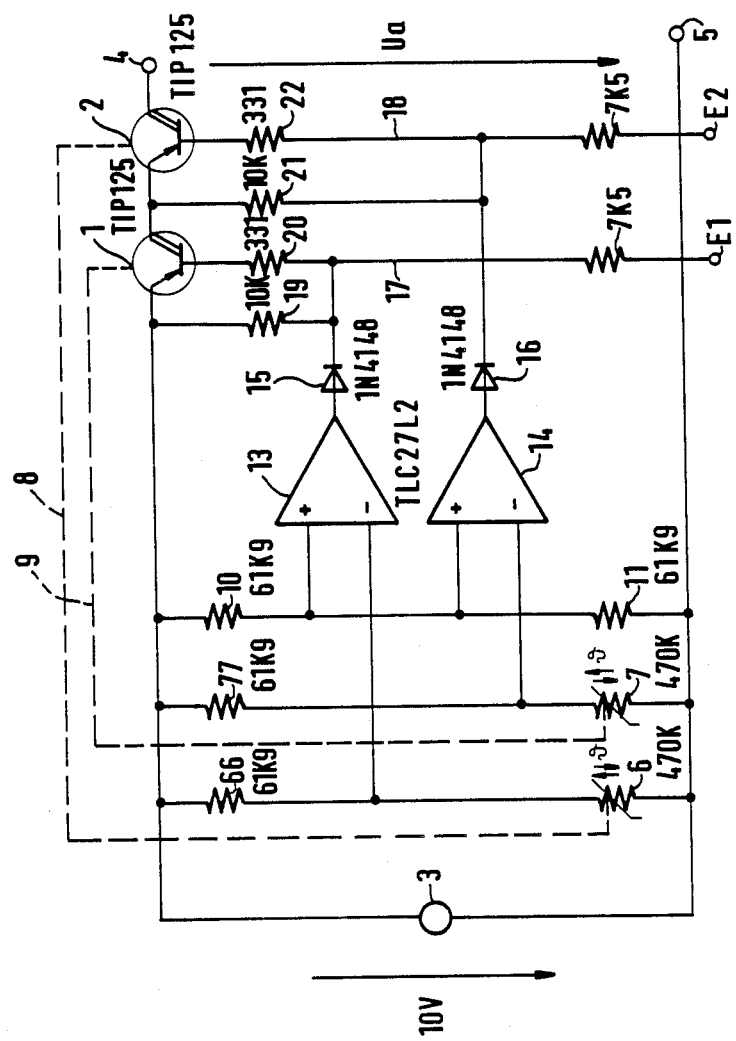
FIG. 1 is a circuit diagram of the combination according to the invention wherein switching components in the form of transistors are connected in series; and, FIG. 2 shows an other embodiment of the combination of the invention wherein the switching components in the form of transistors are connected in parallel.

The schematic of FIG. 1 shows an electric transistor switching circuit which includes two transistors (1, 2) which are supplied from a voltage source 3. A voltage drop Ua appears across the output terminals (4, 5); that is, across the collector of the transistor 2 and the voltage source 3. This voltage drop Ua supplies a load which is not illustrated. The transistors (1, 2) are thermally connected with corresponding NTC-resistors (6, 7). This thermal connection is illustrated in FIG. 1 by the dashed lines (8, 9). The NTC-resistors (6, 7) are spatially connected with the transistors (1, 2), and electrically, the NTC-resistors form the branches of respective resistance bridges of which the first resistance bridge includes resistors (10, 11, 6, 66) and the second resistance bridge includes the resistors (10, 11, 7, 77). The fixed leg with the bridge resistors (10, 11) is connected to the non-inverting input of the comparators (13, 14). The center takeoff of the variable leg of the resistance bridge 6 is connected to comparator 13 and the variable leg (7, 77) is connected to the other comparator 14. Both outputs of the comparators (13, 14) are provided with respective diodes (15, 16) and connected to corresponding ones of base leads (17, 18) of respective transistors (1, 2). These base leads (17, 18) are connected via control inputs (El, E2). The resistances and diodes are conventional components whose electrical values are given in FIG. 1.

As an example, it can be assumed that transistor 1 becomes too hot because of a defect so that the NTC-resistor 7 connected thermally to the latter unbalances the voltage divider (7, 77).

Assuming the ratio $R7/R77 < R11/R10$, then the output voltage of the corresponding comparator 14 switches to a positive voltage and the diode 16 becomes conducting and blocks the transistor 2 which is still intact via the line 18. In this way, the current flow through the output terminals (4, 5) and the defective transistor 1 is interrupted.

Figure 2:
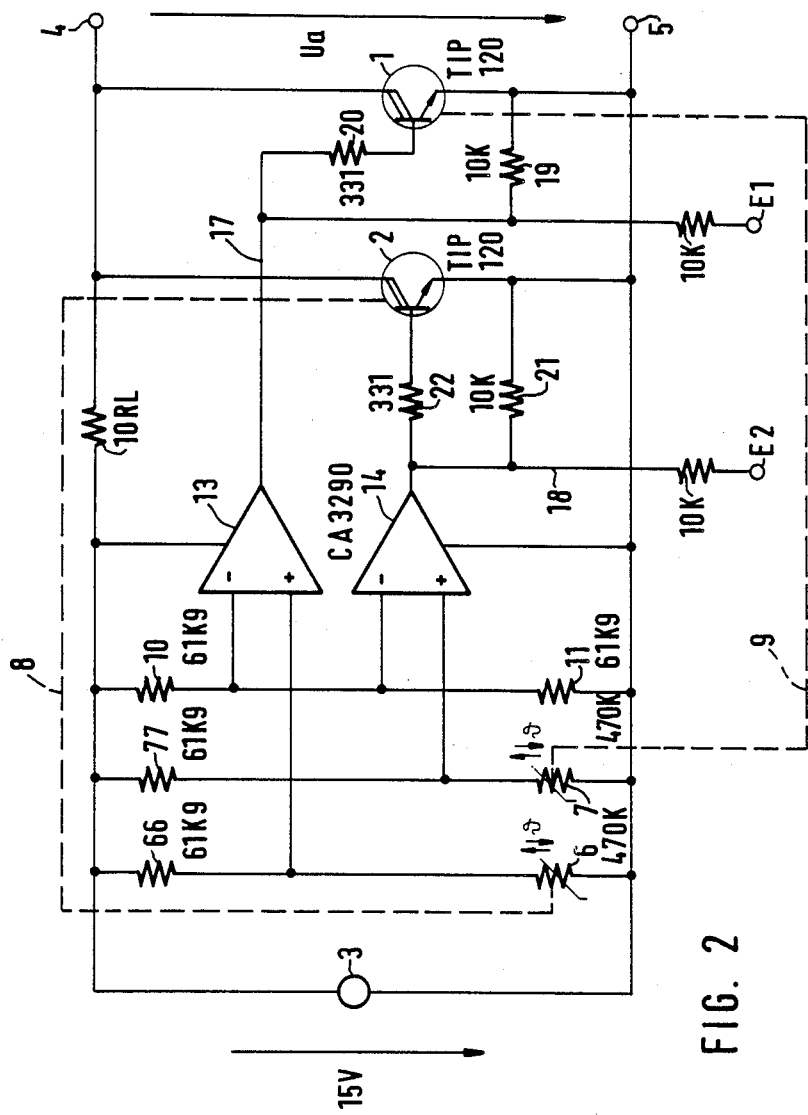

FIG. 2 shows a schematic similar to the schematic shown in FIG. 1 in which the same components have the same reference numerals. The two transistors (1, 2) are connected in parallel to the voltage source and to the output terminals (4, 5). During normal operation, the transistors (1, 2) can control the circuit so as to cause the voltage drop Ua across the output terminals (4, 5) to have the required value.

In the event of a malfunction, for example when the transistor 1 becomes highly resistive and takes on an undesired temperature, this is announced via resistor 7 to the transistor 2 which then short-circuits the output terminals (4, 5). The entire power is then consumed in a load resistor 10RL which is selected so as to be resistant to a short-circuit. Further heating of transistor 1 is prevented by the short circuit across transistor 2 so that the transistor 1 cools off.

In both switching configurations according to FIGS. 1 and 2, the control signals for driving the transistors (1, 2) via the input terminals (El, E2) are applied at the respective bases of the transistors (1, 2). In this way, the output voltage Ua can be influenced in the desired manner. The resistors (19, 20, 21, 22) limit the electric power supplied via lines (17, 18) to the semiconductors (1, 2, 13, 14, 15, 17) to a thermal non-critical value.

It is understood that the foregoing description is that of the preferred embodiments of the invention and that various changes and modifications may be made thereto without departing from the spirit and scope of the invention as defined in the appended claims.

What is claimed is:

1. The combination of an apparatus for supplying load current to a load and an arrangement for monitoring a switching component which can influence the load current, the combination comprising:

at least two of said switching components connected to each other and each of which generates heat in the presence of a defect condition;

a first temperature sensor corresponding to one of said switching components for detecting the heat generated therein in the event of a defect condition;

first circuit means for operatively connecting said first temperature sensor to the other one of said switching components for actuating the latter in response to said defect condition to thereby influence said load current to prevent said one switching component from becoming heated to unwanted higher temperatures;

a second temperature sensor corresponding to the other one of said switching components for detecting the heat generated therein in the event of a defect condition; and, second circuit means for operatively connecting said second temperature sensor to said one switching component for actuating the latter in response to said defect condition to thereby influence said load current to prevent said other one of said switching components from becoming heated to unwanted higher temperatures.

2. The combination of claim 1, wherein said switching components are connected to each other in series and said first and second temperature sensors are respective temperature-dependent resistors.

3. The combination of claim 1, wherein said switching components are connected in parallel with each other and said first and second temperature sensors are respective temperature-dependent resistors.

4. The combination of an apparatus for supplying load current to a load and an arrangement for monitoring a switching transistor which can influence the load current, the combination comprising:
- at least two of said switching transistors connected to each other and each of which generates heat in the presence of a defect condition;
- a first temperature-dependent resistor having a resistance varying with temperature and corresponding to one of said switching transistors for detecting the heat generated therein in the event of a defect condition;
- first circuit means for operatively connecting said first temperature-dependent resistor to the other one of said switching transistors for actuating the latter in response to said defect condition in said one switching transistor to thereby influence said load current to prevent said one switching transistor from becoming heated to unwanted higher temperatures;
- said first circuit means including: a first bridge circuit incorporating said first temperature-dependent resistor which becomes unbalanced in response to a change in the resistance of the latter to cause said first bridge circuit to deliver a first signal; and, a first comparator interconnecting said first bridge circuit and said other one of said switching transistors for actuating the latter in response to said first signal thereby influencing said load current;
- a second temperature-dependent resistor having a resistance varying with temperature and corresponding to the other one of said switching transistors for detecting the heat generated therein in the event of a defect condition;
- second circuit means for operatively connecting said second temperature-dependent resistor to said one switching transistor for actuating the latter in response to said defect condition in said other one of said switching transistors to thereby influence said load current to prevent said other one of said switching transistors from becoming heated to unwanted higher temperatures; and,
- said second circuit means including: a second bridge circuit incorporating said second temperature-dependent resistor which becomes unbalanced in response to a change in the resistance of the latter to cause said second bridge circuit to deliver a second signal; and, a second comparator interconnecting said second bridge circuit and said one switching transistor for actuating the latter in response to said second signal thereby influencing said load current.

5. The combination of claim 4, wherein said switching transistors are connected in series with each other and with the load.

6. The combination of claim 4, wherein said switching transistors are connected in parallel and across the load.

* * * * *